(12) United States Patent
Benzatti

(10) Patent No.: US 9,355,385 B2
(45) Date of Patent: May 31, 2016

(54) LOCATION SERVICES IN EMAIL AND CALENDARING WEB SERVICES

(71) Applicant: Microsoft Corporation, Redmond, WA (US)

(72) Inventor: Danilo L. Benzatti, Seattle, WA (US)

(73) Assignee: Microsoft Technology Licensing, Redmond, WA (US)

( * ) Notice: Subject to any disclaimer, the term of this patent is extended or adjusted under 35 U.S.C. 154(b) by 474 days.

(21) Appl. No.: 13/706,351

(22) Filed: Dec. 6, 2012

(65) Prior Publication Data

US 2014/0164358 A1    Jun. 12, 2014

(51) Int. Cl.
G06F 17/30      (2006.01)
G06Q 10/10      (2012.01)

(52) U.S. Cl.
CPC ........ G06Q 10/107 (2013.01); G06F 17/30424 (2013.01); G06F 17/30477 (2013.01); G06F 17/30864 (2013.01); G06Q 10/109 (2013.01)

(58) Field of Classification Search
CPC .................. G06F 17/30424; G06F 17/30477; G06F 17/30864
USPC ................................................ 707/769, 722
See application file for complete search history.

(56) References Cited

U.S. PATENT DOCUMENTS

| | | | |
|---|---|---|---|
| 6,732,080 B1* | 5/2004 | Blants ........................... | 705/7.18 |
| 7,657,655 B2 | 2/2010 | Hampton | |
| 7,941,430 B2 | 5/2011 | Meema | |
| 2007/0061308 A1* | 3/2007 | Hartwell et al. .................. | 707/3 |
| 2008/0189619 A1* | 8/2008 | Reed et al. ..................... | 715/751 |
| 2008/0195454 A1* | 8/2008 | Lee .................................. | 705/8 |
| 2008/0195705 A1* | 8/2008 | Lee ............................... | 709/204 |
| 2009/0055353 A1* | 2/2009 | Meema ........................... | 707/3 |
| 2013/0218991 A1* | 8/2013 | McConnell et al. .......... | 709/206 |

OTHER PUBLICATIONS

"Places API for JavaScript", Retrieved at <<http://www.developer.nokia.com/Develop/Maps/Places_API_for_JavaScript.xhtml>>, Retrieved Date: Sep. 18, 2012, pp. 3.
"GET Geo/Search", Retrieved at <<https://dev.twitter.com/docs/api/1/get/geo/search>>, Retrieved Date: Sep. 18, 2012, pp. 6.
Tabarcea, et al., "Ad-Hoc Georeferencing of Web-Pages Using Street-Name Prefix", Retrieved at <<http://cs.joensuu.fi/sipu/pub/WEBIST_2010_113_CR.pdf>>, Retrieved Date: Sep. 18, 2012, pp. 8.
"Google Places API (Experimental)", Retrieved at <<https://developers.google.com/places/documentation/autocomplete>>, Retrieved Date: Sep. 18, 2012, pp. 5.
"Location-Based Services API", Retrieved at <<http://docs.blackberry.com/en/developers/deliverables/30946/LBS_category_1716126_11.jsp>>, Retrieved Date: Sep. 18, 2012, p. 1.

* cited by examiner

*Primary Examiner* — Joshua Bullock
(74) *Attorney, Agent, or Firm* — Damon Rieth; Tom Wong; Micky Minhas

(57) ABSTRACT

An application programming interface (API) method for providing location related search capability to clients of an email and calendaring service is disclosed. In response to a request message from a client, a find place method defined in an API provided by an API service is invoked. The find place method parses the request message for parameters such as a query string or source-related identifier indicating a place name or address of a location to be searched, the culture/format for the search and results, a maximum number of results to be provided, the source of the location to search, and geo-coordinates of the place and/or the user. The parameters are used to query specified source(s). The results of the search are filtered and formatted to provide location information to the client.

19 Claims, 6 Drawing Sheets

LOCATION SERVICES IN EMAIL AND CALENDARING WEB SERVICES

BACKGROUND

In recent years, web services have been growing in popularity. In addition, as email and calendaring software evolve to provide more features to end users, there is a push to provide new features for email and calendaring in a manner that can be deployed via web services. Currently, the location field for a meeting or scheduling request is an underutilized component in calendaring and scheduling software. In order to provide opportunities for client applications to provide enhanced location field functionality, an email and calendaring software server will need to be extended to support this functionality and an application programming interface (API) for an email and calendaring web service will need to expose this functionality.

In order to expose a particular functionality, an API method is created along with a corresponding namespace, and the structure for the response from the web service is defined. When a particular functionality is exposed, a client application can then take advantage of the functionality and present enhanced features to a user of a client device on which the client application is run.

BRIEF SUMMARY

An application programming interface (API) for email and calendaring web services is disclosed. The API enables client applications to search and retrieve location related data about a place. The location related data includes, but is not limited to, geo-coordinates, address, website, and other business related information.

In some cases, by providing a method for searching and retrieving location related data about a place, enhanced location fields can be surfaced within client email and calendaring applications. The enhanced location fields can facilitate data entry for users on mobile devices as well as reduce ambiguity in where an appointment or meeting is to take place.

According to an embodiment, when an email and calendaring server receives a request from a client application for finding places, the server performs a search and retrieves location related data about the place(s) requested by the client application. The server then sends a response to the client application.

The API method enables users to search for locations based on names, street addresses, and/or a source-related identifier.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

An application programming interface (API) method for an email and calendaring web service to provide location related search capability is disclosed. A web services API involves a set of request messages available to a client (or server) along with a definition of the structure of response messages sent to the client (or server). The response messages may be in a markup language such as Extensible Markup Language (XML) or JavaScript Object Notation (JSON).

According to one aspect, services are presented to provide enhanced location fields in meeting items. A "meeting item" includes, but is not limited to, a meeting request form, appointment, email, calendar entry, contact entry, and the like. The services include an application programming interface (API) for email and calendaring web services that enables client applications to search and retrieve location related data about a place. The location related data includes, but is not limited to, geo-coordinates, address, website, and other business related information.

Client applications that benefit from APIs of embodiments of the invention include personal information management (PIM) software. Some commonly commercially available PIMs include those sold under the brand name MICROSOFT OUTLOOK, a registered trademark of Microsoft Corp.; and IBM LOTUS NOTES, a registered trademark of International Business Machines Corp. For purposes of this discussion, PIMs also include separate electronic mail applications, such as that available under the brand name MICROSOFT EXCHANGE, a registered trademark of Microsoft Corp.

An example email and calendaring web service is the EXCHANGE Web Services (EWS), which provides an API for clients to be able to create/retrieve email items, calendar items, and contacts, as well as access many other functionalities.

According to an embodiment, a "find places" API method is presented for EWS and other email and calendaring web services. A web server (or an enterprise email and calendaring server) can invoke a find places method in response to a find places request. By surfacing the ability to find places within an email and calendaring software, enhanced location fields can be supported for meeting items. The enhancements to the location fields can include, but are not limited to, providing context, supplemental information, and suggestions for locations of a meeting item.

Figure 1:
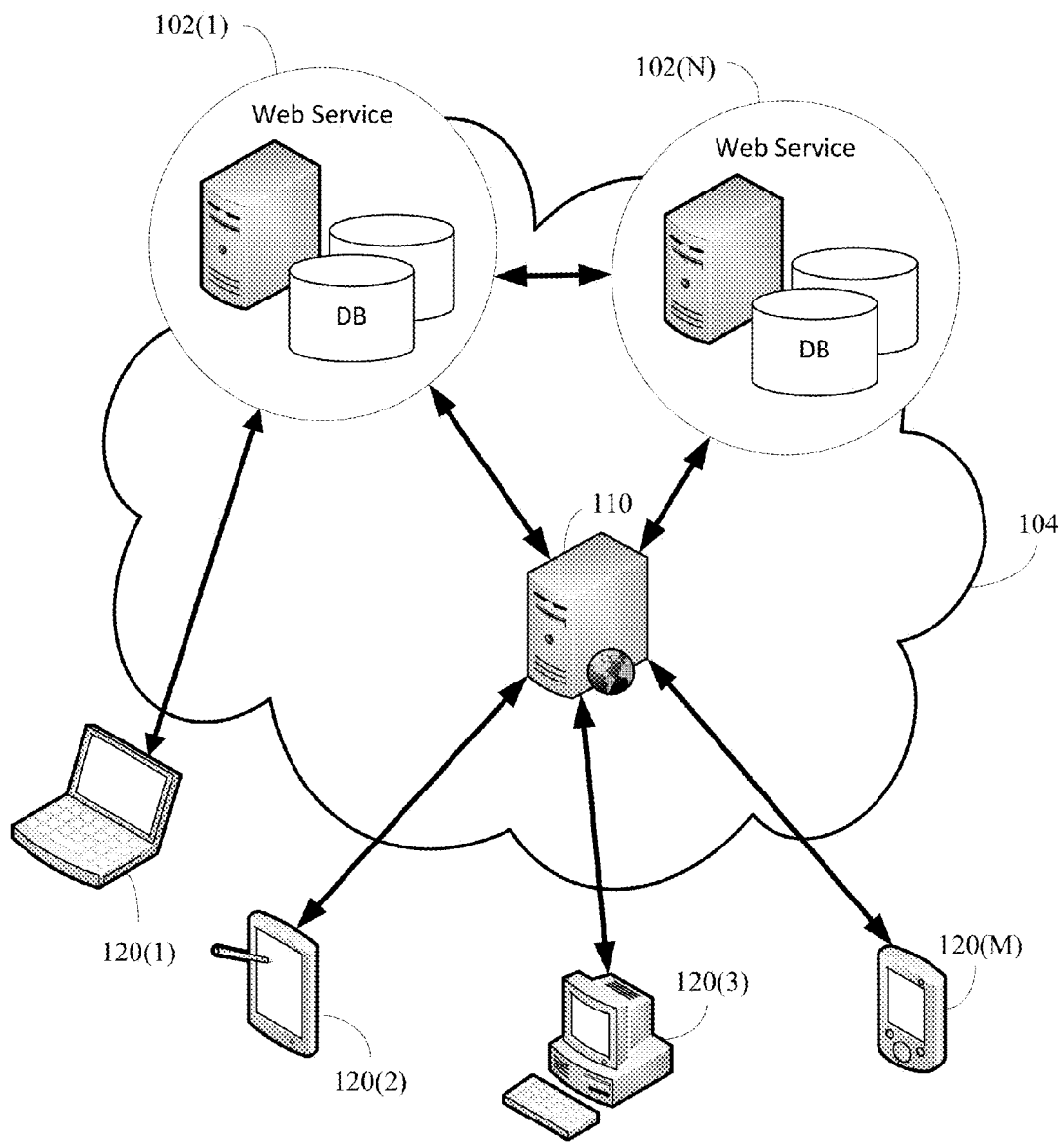
FIG. 1 shows an operating environment in which an embodiment of the invention may be implemented.

FIG. 1 shows an operating environment in which an embodiment of the invention may be implemented. The operating environment includes representative web services 102 (1), . . . , 102(N), which provide services that can be accessed over a network 104.

The network 104 can include, but is not limited to, a cellular network (e.g., wireless phone), a point-to-point dial up connection, a satellite network, the Internet, a local area network (LAN), a wide area network (WAN), a WiFi network, an ad hoc network or a combination thereof. Such networks are widely used to connect various types of network elements, such as hubs, bridges, routers, switches, servers, and gateways. The network 104 may include one or more connected networks (e.g., a multi-network environment) including public networks, such as the Internet, and/or private networks such as a secure enterprise private network. Access to the network 104 may be provided via one or more wired or wireless access networks as will be understood by those skilled in the art.

As will also be appreciated by those skilled in the art, communication networks can take several different forms and can use several different communication protocols. Certain embodiments of the invention can be practiced in distributed-computing environments where tasks are performed by remote-processing devices that are linked through a communications network. In a distributed-computing environment, program modules can be located in both local and remote computer-readable storage media.

The web services, referenced generally as number 102, are programmable application components that can interact programmatically over the network 104, typically through industry standard Web protocols, such as, but not limited to, extensible markup language (XML), JavaScript Object Notation (JSON), Hypertext Transfer Protocol (HTTP) Representational State Transfer (REST), and Simple Object Access Protocol (SOAP).

Each web service 102 may include one or more servers that execute software to handle requests for particular services. Web services may be configured to perform any one of a variety of different services. Examples of web services include login verification, notification, database storage, stock quoting, location directories, mapping, music, electronic wallet, calendar/scheduler, telephone listings, news and information, games, ticketing, and so on. The web services can be combined with each other and with other applications to build variably complex systems and intelligent interactive experiences.

Web services 102 may be requested directly by a client device, such as device 120(1). Web services 102 may also be accessed directly by other servers. According to an embodiment, server 110 can access the web services on behalf of a client device such as devices 120(2), 120(3), . . . , 120(M) (and even device 120(1)).

The client devices, referenced generally as 120, can be implemented many different ways. For example, the client devices can be, but are not limited to, a personal computer (e.g. desktop computer), laptop, personal digital assistant (PDA), mobile phone (or smart phone), tablet, slate, terminal, set-top box, or gaming console, which may be used to access a server, such as server 110, over the network 104. The server 110 may be an enterprise server, cloud based server, dedicated server, host server, or the like.

Certain embodiments of the invention are directed to exposing additional capabilities of an email and calendaring server as part of web services supporting scheduling capabilities, including email and calendaring functions. To provide the enhanced location capabilities for meeting items, the server 110 can be configured to provide an API for location related search capabilities.

According to an embodiment, the server 110 can provide an email and calendaring service for client devices 120. The email and calendaring service can receive email messages and meeting requests addressed to an account associated with a user and can enable the user to retrieve and view such email messages and meeting requests. The email service can also send email messages and meeting requests from the account associated with the user.

Figure 2:
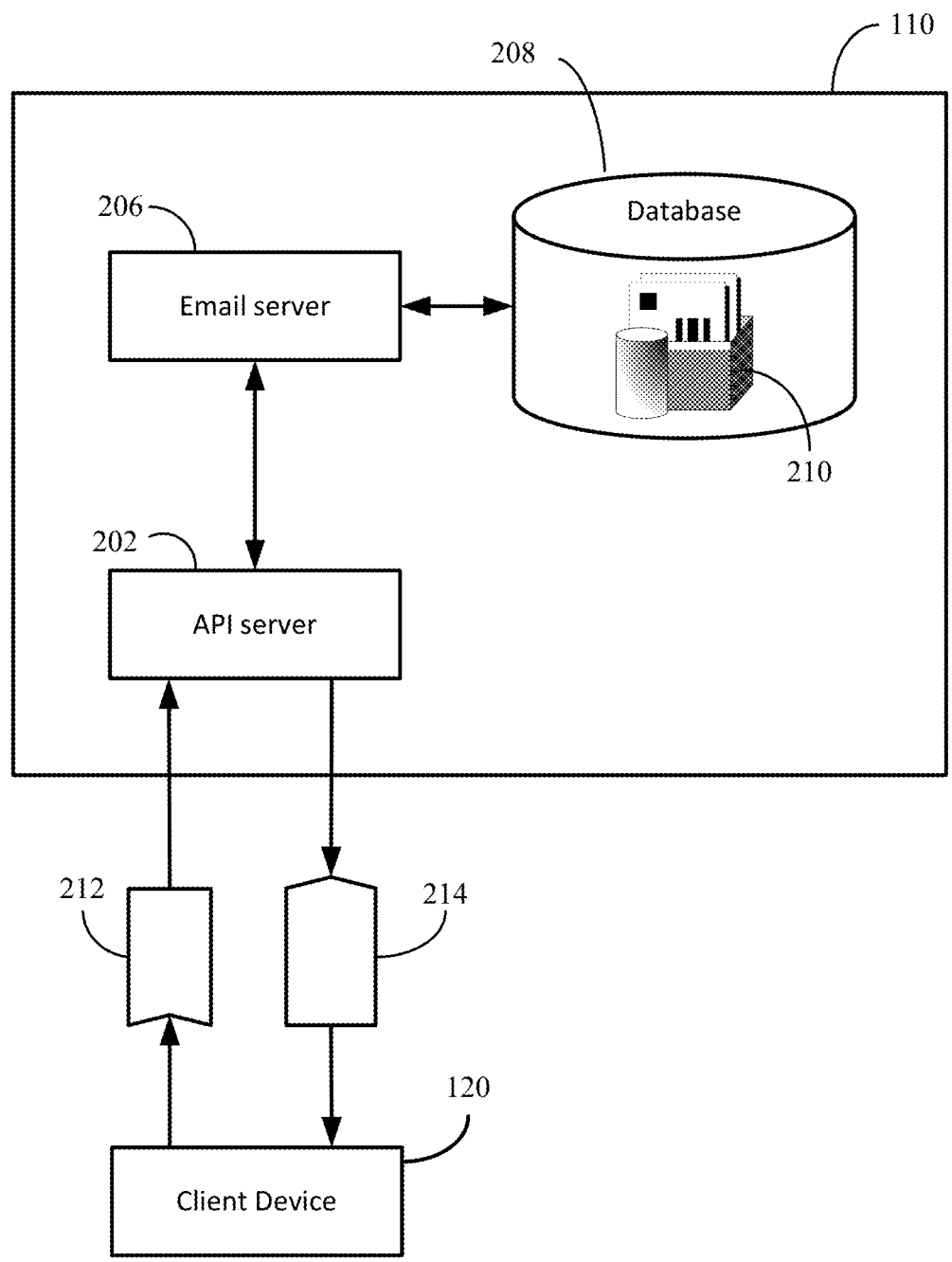
FIG. 2 shows a block diagram illustrating example details of an email and calendaring server used in some embodiments of the invention.

FIG. 2 shows a block diagram illustrating example details of an email and calendaring server used in some embodiments of the invention. The server 110 may include one or more computing devices. For example, the server 110 can include one or more blade server devices, standalone server devices, personal computers, routers, hubs, switches, bridges, firewall devices, intrusion detection devices, mainframe computers, network-attached storage devices, and other types of computing devices.

A computing device can have hardware including one or more central processing units (CPUs), memory, mass storage (e.g., hard drive), and I/O devices (e.g., network interface, user input devices). Elements of the computer system hardware can communicate with each other via a bus. Computer system hardware can be configured according to any suitable computer architectures such as a Symmetric Multi-Processing (SMP) architecture or a Non-Uniform Memory Access (NUMA) architecture. The one or more CPUs may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the computer hardware of the system in place of or in addition to a general purpose CPU.

In embodiments where the server 110 includes multiple computing devices, the server can include one or more communications networks that facilitate communication among the computing devices.

For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

As illustrated in the example of FIG. 2, the server 110 includes an API server 202, an email server 206, and database 208. In various embodiments, the API server 202 and the email server 206 can be implemented in various ways. For example, the API server 202 and the email server 206 can be implemented as application software, utility software, or another type of software executed by one or more processing units of computing devices in the server system 110. Furthermore, in some embodiments, the API server 202 and the email server 206 can be implemented using one or more application-specific integrated circuits (ASICs).

The API server 202 can be used to expose functionality available through the email server 206. The database 208 can store email messages (for example, in a mailbox 210), contact information, and other related information. A mailbox 210 is a type of data repository that represents a storage area for email messages. The user can use a web browser or other application operating on a client device to check and send email messages using an email service provided by the server 110. Other services that may be available through the server 110 include, but are not limited to, scheduling and calendaring services, contact management services, task management services, document management services, and other types of web services.

The API server 202 provides an API service for server 110. The API service enables clients, such as client device(s) 120, to invoke methods in an API. The API can include a locations method for an email and calendaring service as described herein.

When a user interacts with a location field via a user interface displayed at a client device 120, the client device 120 provides a request message 212 to the API server 202. The request message 212 is a request to invoke the location method of the API. When the API server 202 receives the request message 212, the API server 202 invokes a locations method such as described with respect to FIGS. 3 and 4.

Figure 3:
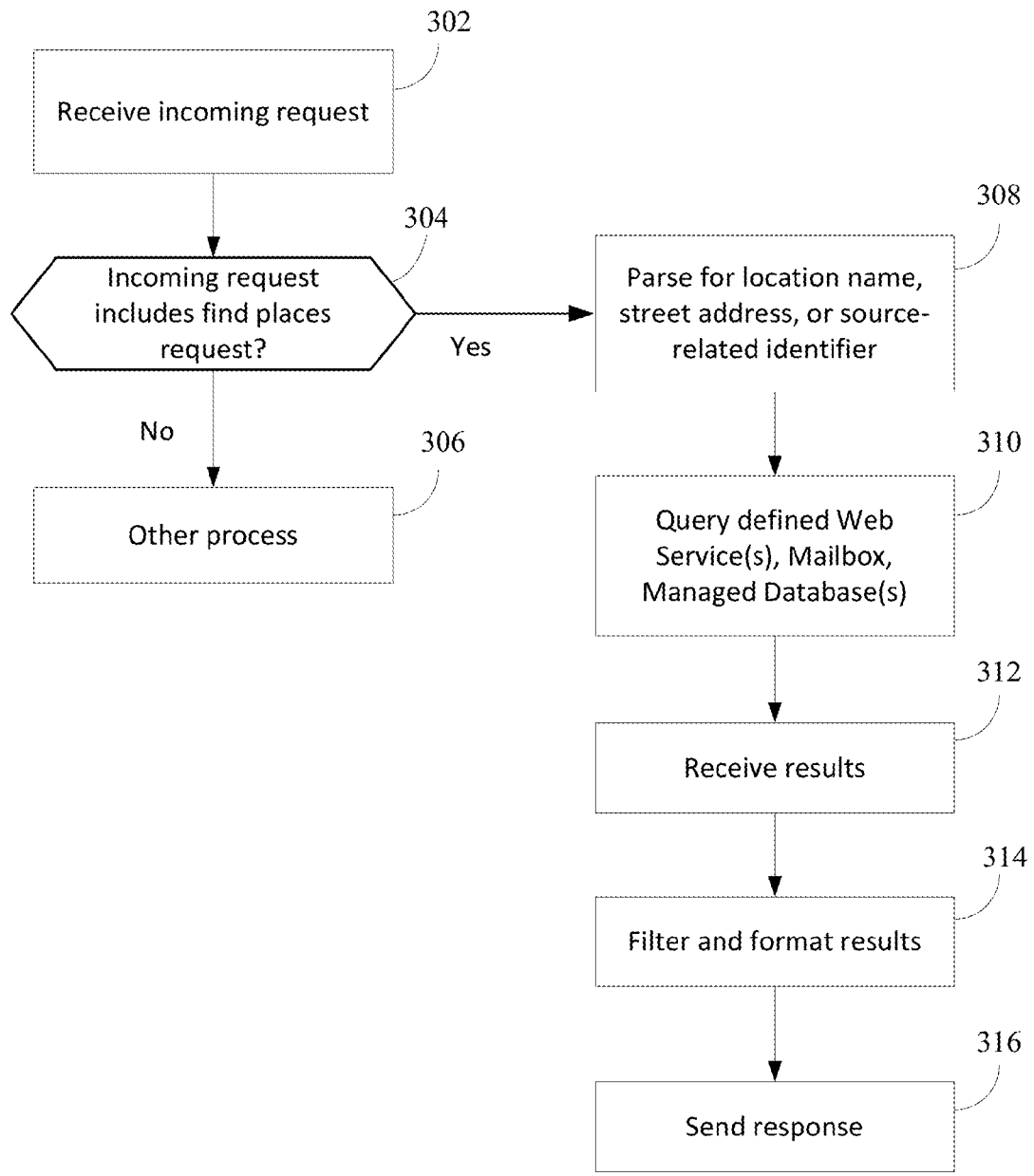
FIG. 3 is a flowchart illustrating an example operation performed by an email and calendaring server according to an embodiment of the invention

FIG. 3 is a flowchart illustrating an example operation performed by an email and calendaring server according to an embodiment of the invention. The example operation can be performed by the API server 202. For example, the API server 202 can receive an incoming request message 212 (302). The incoming message 212 can be received by the API server 202 in various ways. For example, the API server 202 can receive the incoming message as a SOAP protocol message. In another example, the API server 202 can receive the incoming message as a remote procedure call (RPC) message. Other protocols may be used in various implementations as well.

When the API server 202 receives the incoming message, the API server 202 determines whether the incoming message includes a find places request (304). The find places request includes a query that specifies a name or address of a place or a source-related identifier of a place. If the incoming message does not include the find places request ("No" of 304), the API server 202 continues to other process(es) (306).

If the incoming message includes the find places request ("Yes" of 304), the API server 202 parses the message for location name, street address, or source-related identifier (308) and uses the location name, street address, or source-related identifier to query defined information sources including, but not limited to specified web service(s), mailbox, and managed database(s) (310).

Once the API server 202 receives the results from the information sources (312), the API server 202 filters the results and generates a response message 214 in an appropriate format (314). In various embodiments, the filtered results (e.g., the response data) can be formatted in various ways. For example, the response data can be formatted as a set of XML elements. In another example, the response data can be formatted as a series of comma-separated values or name-value pairs.

The response message 214 can conform to various communications protocols. For example, the response message 214 can conform to the SOAP protocol, the RPC protocol, the HTTP protocol, JSON, or another communications protocol. After preparing the outgoing message, the API server 202 sends the response message 214 to the client device 120 (316). For an email application, communication between the client device 120 and the API server 202 may be carried out, at least in part, according to a Simple Mail Transfer Protocol (SMTP).

Figure 4A:
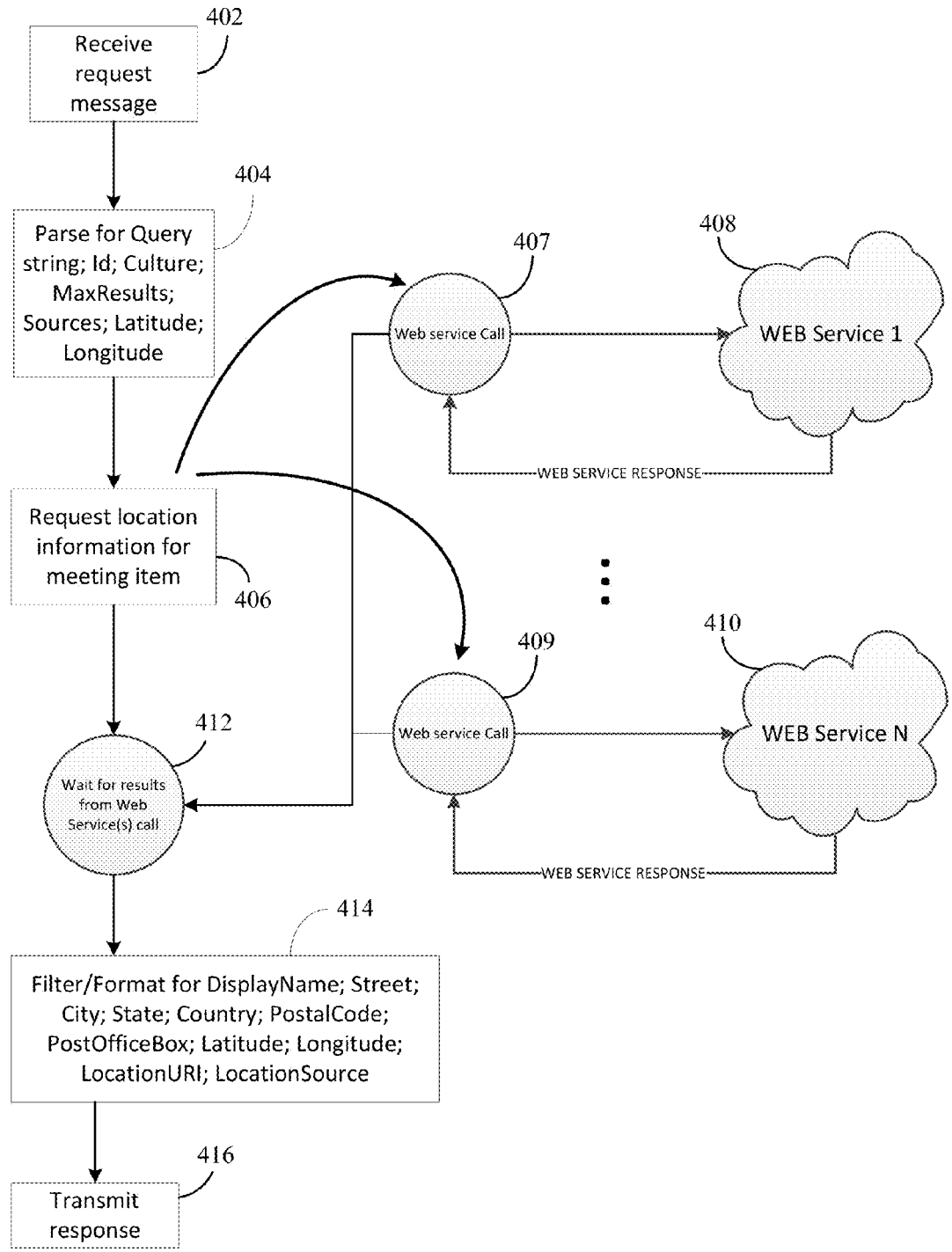
FIG. 4A shows a diagram of a process carried out by an email and calendaring server according to an embodiment of the invention.
Figure 4B:
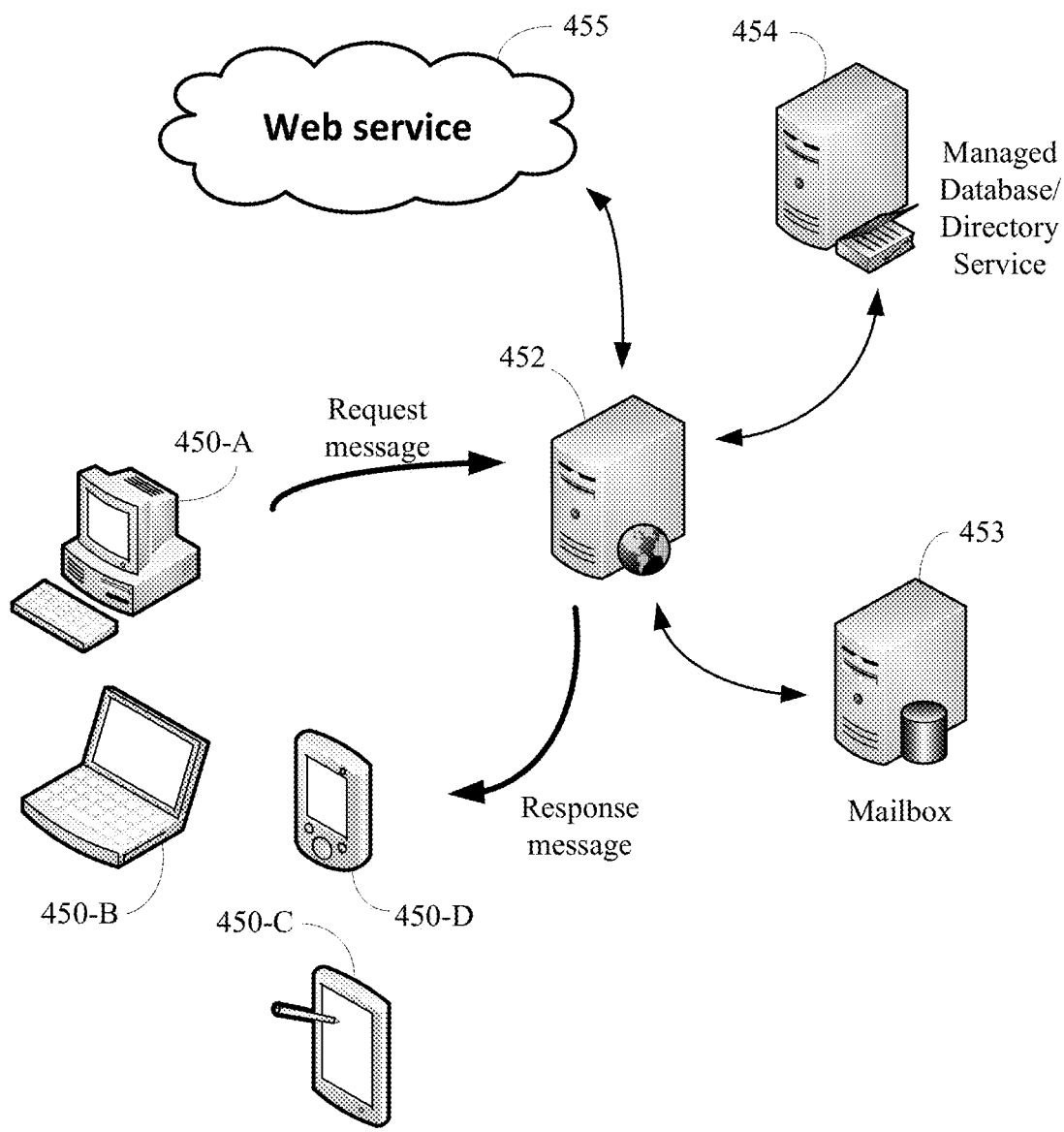
FIG. 4B shows an operating environment in which an embodiment of the invention may be practiced.

An example process carried out by an email and calendaring server and operating environment are shown in FIGS. 4A and 4B.

A find places method can begin in response to receiving a request message (e.g., request message 212) from a client application (402). The request message received from the client application can be parsed for particular parameters (404).

In various embodiments, the request message is formatted in various ways and may be implemented using XML or JSON, for example. In some embodiments, the request message is formatted as a SOAP request, but other protocols may be used. In an example embodiment, the request message is formatted using JSON. According to certain embodiments of the invention, a request message (e.g., request message 212) invoking the find places method can include a defined "FindPlacesType" that includes one or more of the following parameters:

FindPlacesRequest.

The schema for a request to FindPlaces can call a particular mail server or other server providing the email and calendaring services.

Sources.

The sources parameter is used to indicate the source of the location to search and can be provided as a name or code of the source of the location to search. For example, the sources parameter can include a request to search a phonebook service, map service, a user's mailbox, and the like.

MaxResults.

The request can indicate the maximum number of results to be provided in the response. This parameter can be set according to screen size of the user's device or by some other constraint.

Culture.

The culture parameter can be used to indicate the culture-specific formatting of a result and can be based on the market being searched. Examples of culture code include en-US (American English), en-GB (British English), ja-JP (Japanese), es-MX (Spanish-Mexico) and de-DE (German).

Query.

The request can include a query string to search. The query string may be zero, one, two, or more characters and can be used, for example, to facilitate an autocomplete or location suggestion within a location field of a meeting item displayed at a client device.

Id.

The id parameter can be used to indicate a look-up source-related identifier of a place. The id may be used in addition to or in place of a query string. A client application can reference a stored identifier—the id—for locations and use the id to request up to date information regarding the location.

The particular id associated with a location may depend on the source with which the location is associated. That is, the id may correspond to the source of the information and be used by the source to provide the most recent information about the location. For example, when the location source is a phonebook service, the location URI (e.g., a uniform resource identifier for a geographic location) can be a string of characters providing a unique identification for the location that is understood by the phonebook service. This URI can be stored as the location's id, which is used in the look-up operation (e.g., the find places method) on the server for additional information. One example of such an id is a YPID from BING phonebook services. BING is a registered trademark of Microsoft Corp.

Latitude.

The latitude geo-coordinate associated with a location or user (upon permission of the user) can be indicated using the Latitude parameter.

Longitude.

The longitude geo-coordinate associated with a location or user (upon permission of the user) can be indicated using the Longitude parameter.

When the server receives the request message indicating the defined FindPlacesType and the corresponding parameters parsed, the server can use the parsed parameters to obtain location information from available sources. For example, the location information for the meeting item can be requested (406) by performing a call (or calls) (407; 409) to the web service(s) (408; 410) relevant to the query as well as, in some embodiments, a search of databases associated with the email and calendaring server (e.g., database 208 associated with server 110 of FIG. 2).

It should be understood that although web services are illustrated and described with respect to FIG. 4A, embodiments are not limited to using only web services as sources of location information (see e.g., FIG. 4B).

An example of web services that may be used in accordance with an embodiment of the invention includes the BING Application Programming Interface (API) source types, including the phonebook source type through the BING Phonebook service and location source type through the BING location service.

For RESTful services, the email and calendaring server can perform an HTTP GET request; for SOAP services, the email and calendaring server can perform an appropriately configured request. The HTTP GET request retrieves whatever information (in the form of an entity) is identified by the Request-URI, which may be obtained as part of the request message received by the server (and may be the identifier associated with the location being searched).

Returning to FIG. 4A, other processes may be carried out while waiting for the result response(s) (412) from the web service call(s). Once the results are received, the results can be filtered and a response message (such as response message 214 of FIG. 2) can be generated in an appropriate format (414). The email and calendaring web service can format the reply obtained from the web services into a manner suitable for transmission to the client application.

For example, the reply to the client (e.g., response message 214) can be formatted as a SOAP response or other appropriate protocol. The response message may be provided, for example, in XML or JSON. According to certain embodiments of the invention, a response message (e.g., response message 214) can include a defined "FindLocationResultsType" element that includes one or more of the following parameters (and/or conforms to the following schema):

DisplayName.

The DisplayName parameter provides the display name of the place. Example display names include "Coffee Shop" or "Seattle-Tacoma International Airport" or "123 Main Street".

Street.

The street parameter indicates the street address of the place.

City.

The city parameter indicates the city name of the place.

State.

The state parameter indicates the state name of the place.

Country.

The country parameter indicates the country name of the place.

PostalCode.

The PostalCode parameter indicates the postal code of the place.

PostOfficeBox.

The PostOfficeBox parameter indicates the P.O. Box of the place.

Latitude.

The Latitude parameter provides the latitude geo-coordinate associated with the place.

Longitude.

The Longitude parameter provides the longitude geo-coordinate associated with the place.

LocationUri.

The URI that uniquely identifies the place can be provided with the LocationUri parameter.

LocationSource.

The LocationSource parameter indicates source of the location information. Examples of sources include, but are not limited to the BING Phonebook services, the BING Location services, and a user's history.

PhoneNumber.

The PhoneNumber (or BusinessPhoneNumber) parameter indicates the phone number of the place.

BusinessHomePages.

The business web site url of the place can be indicated by the BusinesHomePages parameter.

PersonalHomePages.

A secondary web site url can be provided from an aggregator site that provides an information page about the place and included in the results through the PersonalHomePages parameter.

Once the appropriate information is filtered and formatted using the defined parameters, the generated response message can be transmitted to the client application (416).

As shown in FIG. 4B, a user computing device, such as a personal computer 401-A, laptop 401-B, smart phone 401-C, tablet 401-D, and the like, can send a request message to a server 452. Server 452 can provide an email and calendaring service. The server 452 can also provide a find places API that queries sources of location information in order to facilitate an enhanced location field within a meeting item of a PIM application being operated on a user computing device.

When the server 452 receives the query of the request message, the server 452 can request location information from a variety of sources including a mailbox server (or mailbox associated with the user) 453, managed database or directory service 454, or various web services 455. The results from the various sources are filtered and formatted to provide a response message to the user computing device.

The results can provide additional information related to a place indicated as part of the location field for a meeting item. By providing the location services, client applications can look up location information from sources having up-to-date information and provide more accurate information about the location of an event or meeting to recipients of a meeting or event request, as well as resolving ambiguities for the user choosing the meeting location. For example, the user can ensure the right location is being referred to by checking the address within the meeting item user interface. Additionally, outdated contact information can be avoided or minimized by dynamically retrieving the most current information from a server in real-time.

The location services can also provide additional functionality for client applications including the ability (upon receiving permission) to search for locations near the user (or some other specified location) or that the user has used before through a location field of a meeting item. The location search can be based on names or street addresses and search for locations based on a source-related identifier for a place, such as a YPID.

The following are a few examples of a request and response utilizing some of the available parameters of an API method for providing location related search capability of client applications of an email and calendaring server. The following examples are illustrative of some of the methods, applications, embodiments and variants of the present invention. They are, of course, not to be considered in any way limitative of the invention. Numerous changes and modifications can be made with respect to the invention.

Figure 5:
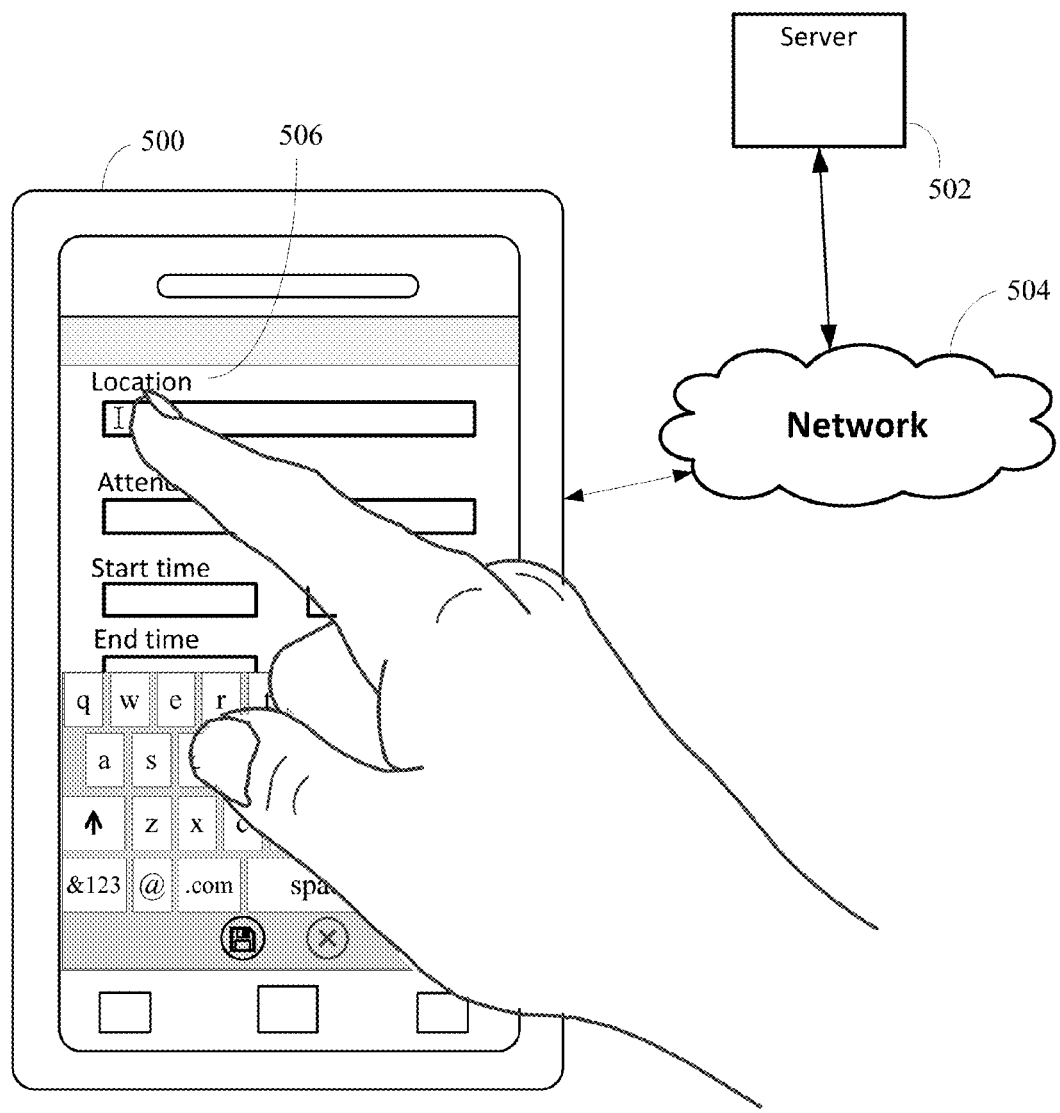
FIG. 5 shows an example operating environment in which a request and response according to an embodiment of the invention is implemented.

FIG. 5 shows an example operating environment in which a request and response according to an embodiment of the invention is implemented. As shown in FIG. 5, a client device 500 can communicate with a server 502 over a network 504 to send and receive requests and responses according to an API method of an email and calendaring server 502 for providing location related search capability of client applications running on the client device 500 (or accessed via a browser running on the client device 500).

By providing the location services as part of an email and calendaring service, the physical address and other information regarding a location can be retrieved as needed for the client application instead of being stored locally in a storage media associated with the client device 500 or as part of the email and calendaring server. Upon receiving the response from the server 502 (such as via the transmitted response 416), the data is displayed to the user.

In one example case, a user may be operating a PIM application through a browser, such as available by the webmail service OUTLOOK Web App (OWA) available from Microsoft Corp. The webmail service enables the user to connect remotely to a mail server such as a MICROSOFT EXCHANGE Server.

The server 502 may be implemented as described with respect to FIG. 2, for example. The operating environment shown in FIG. 5 may be used in carrying out one or more of the examples described below.

Example 1

Request for the Top 8 Locations Most Frequently Used by the User

As a user interacts with a location input field 506 of a meeting item, the client application can send a request (e.g., to server 502 of FIG. 5) for the top 8 locations most frequency used by the user by sending, in a request message, an indication that the message includes a find places request along with a query as follows:

```
{"_type":"FindPlacesRequest:#MailServer","Sources":1,
"MaxResults":8, "Culture":"en-US","Query":""}
```

The API server can receive the request message and parse the message for the "query," "id," "culture," "maxresults," "sources," "latitude," and "longitude." Here, the message includes information regarding the sources to query, the maximum results to return, the culture/format of the information, and the particular string to search for (i.e., query). The empty string provided for the "query" facilitates the return of the frequently used strings. In addition, the sources are specified in this example using a code; however, in some embodiments, a specific source or URL may be provided in the request message.

For this example embodiment, the sources searched can be all sources previously searched in the user's history or all available sources. In this example, the searched sources include the BING Phonebook Service, the BING Location Service, and the user's mailbox.

Once the API server receives the results from the search of the defined sources, the results can be filtered and formatted to provide an example response as follows with 3 results:

```
[{"PersonaId":null,"PersonaType":"Place","DisplayName":
"123 Main Street, Seattle, WA","RelevanceScore":xxxxxxxxxxx,
"BusinessAddresses":[{"Value":{"Street":"123 Main Street ",
"City":"Seattle", "State":"WA", "Country":"United States",
"PostalCode":"98100", "PostOfficeBox":null,"Type":"Business",
"Latitude":xx.xxxxxxxxxxxx,"Longitude":-yyy.yyyyyyyyyyyy,
"LocationUri":"123 Main Street, Seattle, WA",
"LocationSource":"LocationServices"},"Attributions":["0"]}]},
{"PersonaId":null, "PersonaType":"Place",
"DisplayName":"Coffee Shop", "RelevanceScore":xxxxxxxxxxx,
"BusinessAddresses":[{"Value":{"Street":"55555 NE 55th St",
"City":"Redmond","State":"WA","Country":"US",
```

-continued

```
"PostalCode":"98052", "PostOfficeBox":null,"Type":"Business",
"Latitude":xx.xxxxxxxxxxxx, "Longitude":-yyy.yyyyyyyyyyyy,
"LocationUri":"YNxxxxxxxxxxxxx",
"LocationSource":"PhonebookServices"}, "Attributions":["0"]}]},
    {"PersonaId":null,"PersonaType":"Place","DisplayName":
"Coffee Shop", "RelevanceScore":xxxxxxxxxxx,
"BusinessAddresses":[{"Value":{"Street":"88888 8th Ave NE # 8",
"City":"Redmond", "State":"WA", "Country":"US",
"PostalCode":"98052", "PostOfficeBox":null, "Type":"Business",
"Latitude":xx.xxxxxxxxxxxx, "Longitude":-yyy.yyyyyyyyyyy ,
"LocationUri":"YNxxxxxxxxxxxxx",
"LocationSource":"PhonebookServices"}, "Attributions":["0"]}]}]
```

Example 2

Request for 1 Location by the Name of "Coffee Shop"

A user may interact with a location field of a received meeting item in a manner that the client application would present a contact card or other information about a meeting location. When such an interaction occurs, the client application can send a request for information about the location by sending, in a request message, an indication that the message includes a find places request along with a query as follows:

```
{"_type":"FindPlacesRequest:#MailServer",
"Sources":6,"MaxResults":1, "Culture":"en-US",
"Query":"Coffee Shop"}
```

The API server can receive the request message and parse the message for the "query," "id," "culture," "maxresults," "sources," "latitude," and "longitude." Here, the message includes information regarding the sources to query, the maximum results to return, the culture/format of the information, and the particular string to search for (i.e., query). In this example, a place name, "Coffee Shop" is provided as the query string. It should be understood that in various embodiments, a place name may be an actual business name, a category, or an alias. In some cases, the place name can be resolved with geo-coordinates and/or other information before or after a user sends a meeting item to a recipient.

In this example, the sources are specified using a code understood by the API server. Of course in some embodiments, a specific source or URL may be provided in the request message.

Once the API server receives the results from the search of the defined sources, the results can be filtered and formatted to provide an example response as follows with the combined results from multiple sources about the location:

```
[{"PersonaId":null,"PersonaType":"Place","DisplayName":
"Coffee Shop", "RelevanceScore":xxxxxxxxxxx,
"BusinessPhoneNumbers":[{"Value":{"Number":"(555) 555-5555",
"Type":"Business"}, "Attributions":["0"]}], "BusinessHomePages":
[{"Value":"http:A .comV ","Attributions":["0"]}],
"PersonalHomePages":[{"Value":
"http:W www.bing.comV localV Details.aspx?lid=YNxxxxxx
xxxxxx","Attributions":["0"]}], "BusinessAddresses":[{"Value":
{"Street":"88888 8th Ave NE # 8", "City":"Redmond", "State":"WA",
"Country":"US", "PostalCode":"98052", "PostOfficeBox":null,
"Type":"Business", "Latitude":xx.xxxxxxxxxxxx, "Longitude":-
yyy.yyyyyyyyyyyy, "FormattedAddress":"88888 8th Ave NE # 8,
Redmond, WA 98052 US","LocationUri":"YNxxxxxxxxxxxxx",
"LocationSource":"PhonebookServices"}, "Attributions":["0"]}]}]
```

Example 3

Request for the Top 8 Results for Locations by the Name of "Coffee Shop" Previously Used by the User As a user interacts with a location input field of a meeting item, the client application can send a request for the top 8 results for locations previously used by the user by sending in a request message an indication that the message includes a find places request along with a query as follows:

```
{"_type":"FindPlacesRequest:#MailServer",
"Sources":1,"MaxResults":8,"Culture":"en-US",
"Query":"Coffee Shop"}
```

The API server can receive the request message and parse the message for the "query," "id," "culture," "maxresults," "sources," "latitude," and "longitude." Here, the message includes information regarding the sources to query, the maximum results to return, the culture/format of the information, and the particular string to search for (i.e., the query).

Once the API server receives the results from the search of the defined sources, the results can be filtered and formatted to provide an example response with 2 results as follows:

```
{"PersonaId":null, "PersonaType":"Place", "DisplayName":
"Coffee Shop", "RelevanceScore":xxxxxxxxxx,
"BusinessAddresses":[{"Value":{"Street":"55555 NE 55th St",
"City":"Redmond","State":"WA","Country":"US",
"PostalCode":"98052","PostOfficeBox":null,"Type":"Business",
"Latitude":xx.xxxxxxxxxxxx, "Longitude":-yyy.yyyyyyyyyyyy,
"LocationUri":"YNxxxxxxxxxxxxx", "LocationSource":
"PhonebookServices"}, "Attributions":["0"]}]},
{"PersonaId":null,"PersonaType":"Place","DisplayName":
"Coffee Shop", "RelevanceScore":xxxxxxxxxx,
"BusinessAddresses":[{"Value":{"Street":"88888 8th Ave NE # 8",
"City":"Redmond", "State":"WA", "Country":
"US", "PostalCode":"98052", "PostOfficeBox":null, "Type":
"Business", "Latitude":xx.xxxxxxxxxxxx,
"Longitude":-yyy.yyyyyyyyyyyy, "LocationUri":"YNxxxxxxxxxxxxx",
"LocationSource":"PhonebookServices"}, "Attributions":["0"]}]}}
```

Certain techniques set forth herein may be described in the general context of computer-executable instructions, such as program modules, executed by one or more computing devices. Generally, program modules include routines, programs, objects, components, and data structures that perform particular tasks or implement particular abstract data types.

Embodiments may be implemented as a computer process, a computing system, or as an article of manufacture, such as a computer program product or computer-readable medium. Certain methods and processes described herein can be embodied as code and/or data, which may be stored on one or more computer-readable media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

In accordance with embodiments of the invention, computer-readable media can be any available computer-readable storage media or communication media that can be accessed by the computer system.

Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer-readable storage media may include volatile and non-volatile, removable and non-removable media implemented in any method or technology for storage of information such as computer-readable instructions, data structures, program modules or other data. For example, a computer-readable storage medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); or other media now known or later developed that is capable of storing computer-readable information/data for use by a computer system. "Computer-readable storage media" should not be construed or interpreted to include any carrier waves or propagating signals.

In addition, the methods and processes described herein can be implemented in hardware modules. For example, the hardware modules can include, but are not limited to, application-specific integrated circuit (ASIC) chips, field programmable gate arrays (FPGAs), and other programmable logic devices now known or later developed. When the hardware modules are activated, the hardware modules perform the methods and processes included within the hardware modules.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

It should be understood that the examples and embodiments described herein are for illustrative purposes only and that various modifications or changes in light thereof will be suggested to persons skilled in the art and are to be included within the spirit and purview of this application.

What is claimed is:
1. A method comprising:
receiving, at an application programming interface (API) server associated with an email and calendaring service, a request message comprising content from a location field within a meeting item from a client of the email and calendaring service, wherein the meeting item includes: a meeting request form, appointment, email, calendar entry, or a contact entry, the request message being a request to invoke a find place method defined in an API provided by the API server; and sending a response message to the client in reply to the request message, the response message comprising results of the find place method, the results comprising location information associated with a place name or source-related identifier indicated by the request message, wherein the find place method comprises:
parsing the request message for the place name, street address, or the source-related identifier;
querying a web service, mailbox, and/or managed database using the place name, the street address, or the source-related identifier;
receiving results of the query; and
filtering and formatting the results to generate the response message.

2. The method of claim 1, wherein the request message specifies a location string corresponding to the place name or street address of a place;
wherein the find place method performs a look-up of information related to the place using the location string.

3. The method of claim 2, wherein the look-up of the information related to the place comprises querying at least one web service.

4. The method of claim 1, wherein the request message specifies the source-related identifier;
wherein the find place method performs a look-up of information related to the place using the source-related identifier, wherein the look-up of the information related to the place comprises querying the web service providing a source of the source-related identifier.

5. The method of claim 4, wherein the source-related identifier comprises an identifier specific to a phone book service.

6. The method of claim 1, wherein the web service comprises a phone book service, a location service, or both the phone book service and the location service.

7. The method of claim 1, wherein the request message comprises at least one parameter selected from the group consisting of a query string, a source-related location identifier, a culture parameter, a maximum number of results, a source of location information, and geo-coordinates of a location or user.

8. The method of claim 1, wherein the response message comprises at least one parameter selected from the group consisting of a display name, street, city, state, country, postal code, post office box, geo-coordinates, uniform resource identifier (URI), a source of location information, phone number, and web site.

9. A server system comprising:
one or more computing devices associated with an email and calendaring server, at least one of the computing devices providing an API server that:
invokes a find places method in response to a request message comprising content from a location field within a meeting item from a client of the email and calendaring service, wherein the meeting item includes: a meeting request form, appointment, email, calendar entry, or a contact entry, the find places method defined by an API provided by the API server; and
sends a response message to the client in reply to the request message, the response message comprising results of the find place method, the results comprising location information associated with a place name or source-related identifier indicated by the request message,
wherein the find place method comprises:
parsing the request message for the place name, street address, or the source-related identifier;
querying a web service, mailbox, and/or managed database using the place name, the street address, or the source-related identifier;
receiving results of the query; and
filtering and formatting the results to generate the response message.

10. The server system of claim 9, wherein the request message specifies a location string corresponding to the place name or street address of a place;
wherein the find place method performs a look-up of information related to the place using the location string.

11. The server system of claim 10, wherein the look-up of the information related to the place comprises querying at least one web service.

12. The server system of claim 9, wherein the request message specifies the source-related identifier;
wherein the find place method performs a look-up of information related to the place using the source-related identifier, wherein the look-up of the information related to the place comprises querying the web service providing a source of the source-related identifier.

13. The server system of claim 12, wherein the source-related identifier comprises an identifier specific to a phone book service.

14. The server system of claim 9, wherein the request message comprises at least one parameter selected from the group consisting of a query string, a source-related location identifier, a culture parameter, a maximum number of results, a source of location information, and geo-coordinates of a location or user.

15. The server system of claim 9, wherein the response message comprises at least one parameter selected from the group consisting of a display name, street, city, state, country, postal code, post office box, geo-coordinates, uniform resource identifier (URI), a source of location information, phone number, and web site.

16. A computer-readable storage medium having instructions stored thereon that, when executed, cause a processor to perform a method comprising:
in response to receiving, from a personal information management application, a request message comprising a find places request and content from a location field within a meeting item of the personal information management application, parsing the request message for a place name, street address, or source-related identifier, wherein the meeting item includes: a meeting request form, appointment, email, calendar entry, or a contact entry;
querying a web service, a mailbox associated with a user of the personal information management application, and/or a managed database using the place name, the street address, or the source-related identifier;
receiving results of the query; and
filtering and formatting the results to generate a response message, the response message comprising location information associated with the place name or the source-related identifier indicated by the request message.

17. The medium of claim 16, wherein the request message comprises at least one parameter selected from the group consisting of a query string, a source-related location identifier, a culture parameter, a maximum number of results, a source of location information, and geo-coordinates of a location or user.

18. The medium of claim 16, wherein the response message comprises at least one parameter selected from the group consisting of a display name, street, city, state, country, postal code, post office box, geo-coordinates, uniform resource identifier (URI), a source of location information, phone number, and web site.

19. The medium of claim 16, wherein querying the web service, the mailbox, and/or managed database using the place name, the street address, or the source-related identifier comprises performing a web service call of a phone book or location service.

* * * * *